United States Patent [19]
Gaborski et al.

[11] Patent Number: 5,553,162
[45] Date of Patent: Sep. 3, 1996

[54] METHOD FOR DETECTING INK JET OR DOT MATRIX PRINTING

[75] Inventors: Roger S. Gaborski; Lori L. Barski, both of Pittsford, N.Y.

[73] Assignee: Eastman Kodak Company, Rochester, N.Y.

[21] Appl. No.: 764,415

[22] Filed: Sep. 23, 1991

[51] Int. Cl.⁶ .................................................. G06K 9/46
[52] U.S. Cl. ........................................ 382/192; 382/292
[58] Field of Search ................................. 358/455, 462; 382/173, 181, 192, 282, 290, 271

[56] References Cited

U.S. PATENT DOCUMENTS

| | | | |
|---|---|---|---|
| 4,411,015 | 10/1983 | Scherl et al. | 382/51 |
| 4,516,262 | 5/1985 | Sakurai | 382/18 |
| 4,547,811 | 10/1985 | Ochi et al. | 358/455 |
| 4,741,046 | 4/1988 | Matsunawa et al. | 382/9 |
| 4,879,753 | 11/1989 | El-Sherbini | 382/50 |
| 4,929,979 | 5/1990 | Kimoto et al. | 355/38 |
| 4,932,065 | 6/1990 | Feldgajer | 382/9 |
| 5,144,566 | 9/1982 | Anderson et al. | 382/18 |

*Primary Examiner*—Jose L. Couso
*Attorney, Agent, or Firm*—Raymond L. Owens

[57] ABSTRACT

The text to be classified as a dot matrix or ink jet printer character is scanned at a suitable resolution. Several horizontal and vertical slices are made through the bitmap image of individual characters. Density values of pixels contained in these slices are stored as a density profile for each slice. As a result of these density profiles, a determination is made as to whether or not the character was printed on a dot matrix or ink jet printer, or whether the characters were printed using a higher quality device such as a daisy wheel printer.

9 Claims, 9 Drawing Sheets

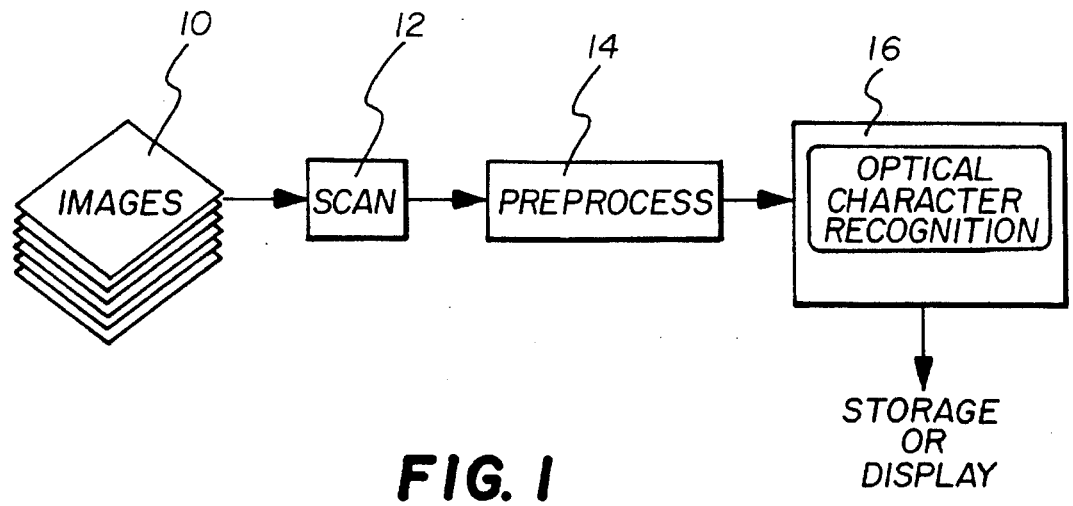
FIG. 1
TODAY IS WEDNESDAY
FIG. 2
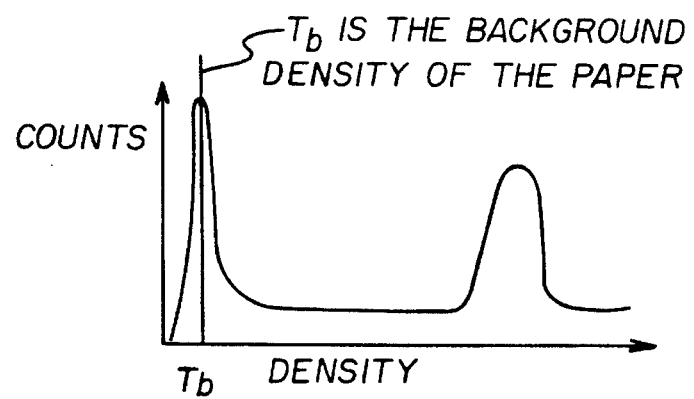
FIG. 4

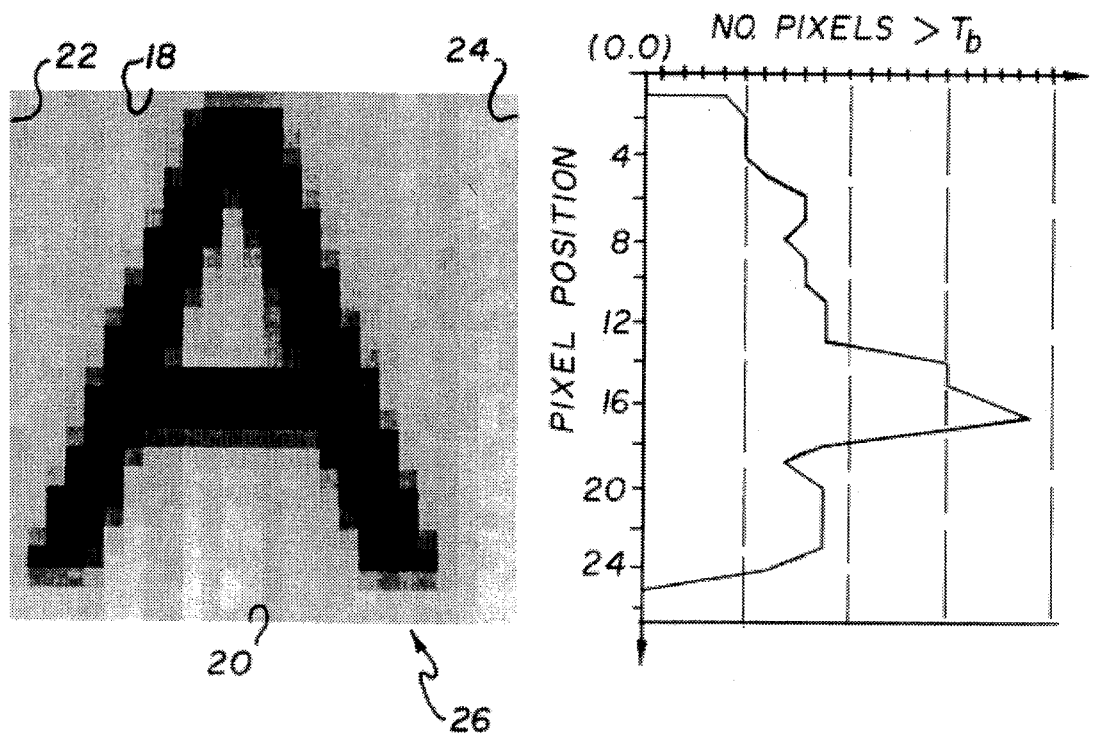
FIG. 3
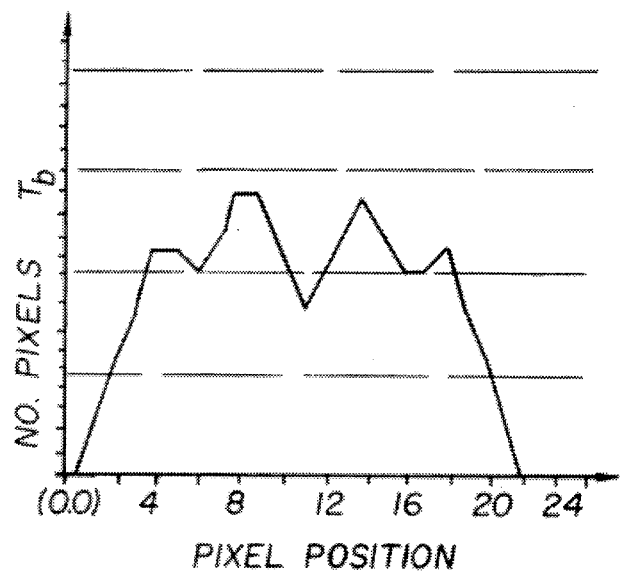

DIFFERENCE DENSITY 5,553,162

1

METHOD FOR DETECTING INK JET OR DOT MATRIX PRINTING

TECHNICAL FIELD OF THE INVENTION

This invention relates to the detection of machine printed characters that were printed on either a dot matrix or ink jet printer. More specifically, the present invention relates to a method of identifying dot matrix or ink jet printed characters based on the characteristics of the density profile of the character strokes.

BACKGROUND OF THE INVENTION

Currently, there are no known algorithms for the detection of machine printed characters that were printed on a dot matrix or ink jet printer.

U.S. Pat. No. 4,547,811 is directed to a method and apparatus for gray level signal processing. A gray level signal processing method determines whether an image signal derived from an original document belongs to the character image area which needs high resolution or the continuous-tone image area which needs gray level reproduction such as for photographs. The process comprises the steps of: Dividing the picture image into blocks, each composed of m×n picture elements. The maximum and minimum optical density levels are detected in each block. Next, the difference between the maximum and minimum optical density levels is calculated. The image area to which the block belongs is determined by the difference value previously calculated. The optimum quantization processing method is selected according to the optical density level of each level.

U.S. Pat. No. 4,741,046 to Matsunawa operates on binary image data, whether processing the entire picture or blocks of the picture, in order to determine if the image is continuous tone, halftone or a line picture. A histogram of the image data is used to quantify the background level and select the appropriate threshold.

DISCLOSURE OF THE INVENTION

It is the principle objective of the present invention to overcome many of the shortcomings encountered in the past and to identify dot-matrix and inkjer printed text in such a way that by selecting the appropriate software, optical character recognition reading accuracy is improved. Accordingly, scanned digitized document images are preprocessed to identify the text as being printed by either a dot matrix or inkjer type printing device or by some other higher quality printing device such as a daisywheel printer, comprising the steps of segmenting the pixel data associated with a matrix of pixel data so as to enable the pixel data associated with an individual character to be isolated. A bounding box is formed around the isolated character and a histogram is generated of the character within the bounding box to establish a density threshold. Next, a plurality of slices are generated through the bounding box and the density per pixel position along each slice is stored, and using the density data obtained above to generate difference data for each slice using adjacent pixels and also generate the density per pixel position measured for each slice. The number of sign changes per pixel are then counted and the average magnitude change of the different data for each slice is determined. This data is used to establish a threshold level for both the number of sign changes per pixel and the average magnitude of change for each slice. If both the number of sign changes and average magnitude exceed their

2 thresholds, then the text printing device can be identified as either being a dot matrix or inkjet type.

The above advantages, and others, will be more readily understood in connection with the following specification, claims, and drawings.

BRIEF DESCRIPTION OF THE DRAWINGS

FIG. 1 illustrates a typical imaging system where the output of the scanner is preprocessed to identify the type of printer used before optical character recognition is initiated;

FIG. 2 illustrates how a line of the text image is segmented into individual characters using a known technique such as vertical histogramming;

FIG. 3 illustrates the use of both vertical and horizontal histogramming to establish a bounding box around a given character;

FIG. 4 illustrates a density histogram for the pixels inside a given area such as a bounding box. The first peak in such a histogram establishes a background density;

MODES OF CARRYING OUT THE INVENTION

Figure 5:
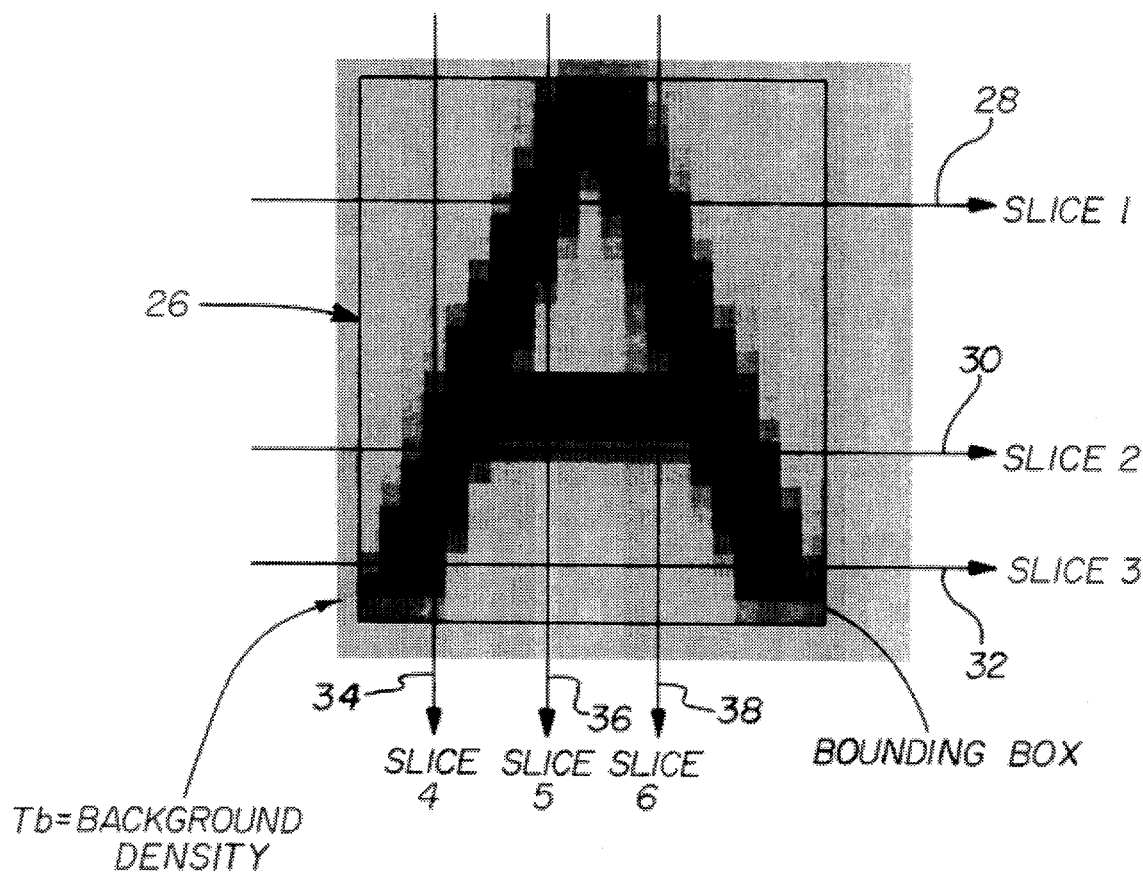
FIG. 5 illustrates a typewritten or printed letter "A" showing the three horizontal and three vertical slices through the character along which density values are stored and profiles are generated.
Figure 6A:
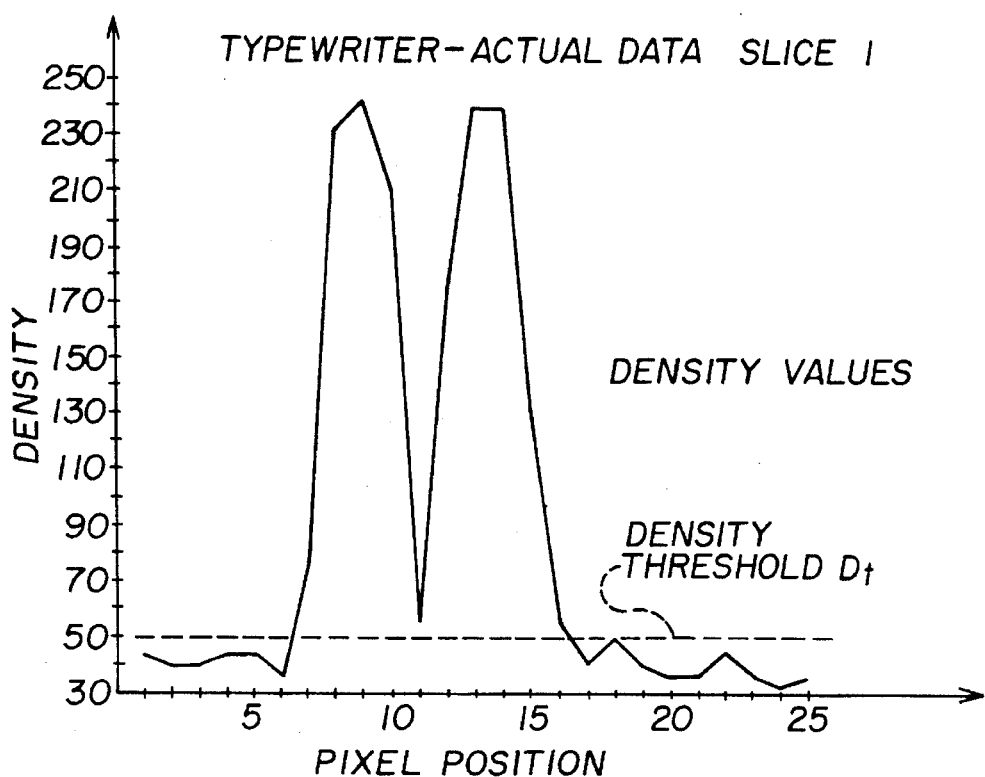
FIG. 6A illustrates a plot of the density vs. pixel position along horizontal slice 1 of the character in FIG. 5.
Figure 6B:
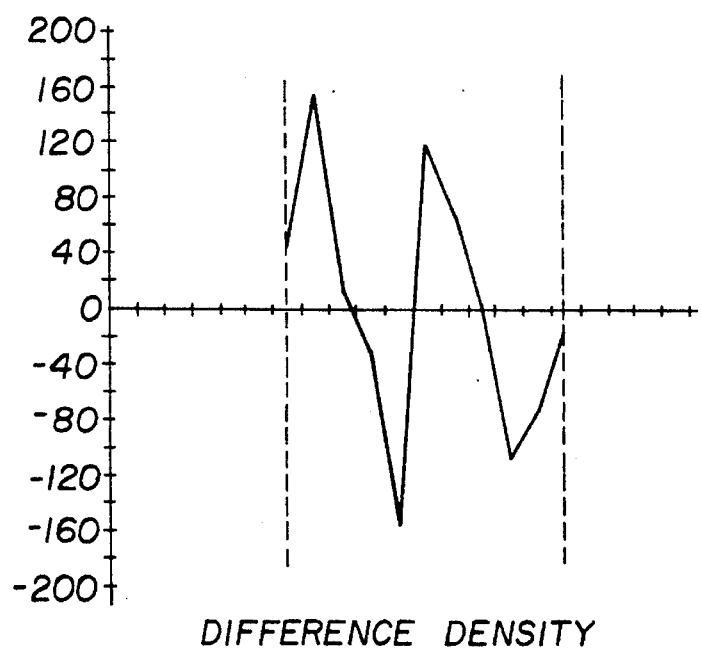
FIG. 6B illustrates a plot of pixel density difference data vs. pixel position for the same slice in the character shown in FIG. 6A. The density difference data is computed by taking the difference between adjacent pixel densities in FIG. 6A.

FIG. 1 illustrates a digital imaging system used to create digital images of a document. The document or specimen may be a picture, chart, graph, text page or other image.

The illuminated document 10 is scanned on a line-by-line basis by a scanner 12. The reflected light from the document is captured by a scanner 12. A charge coupled device (CCD) (not shown) having a linear array of photoresponsive cells as is well known in the prior art, is included in the camera or scanner 12 to produce analog signals at each pixel location within a two-dimensional array of pixel which are proportionate to the pixel reflectivity. The CCD array within the scanner 12 is mechanically displace orthogonally to its linear array to effect a full two dimensional scan of the document 10. The scanner 12 contains circuitry for effecting a conversion of the analog to multi-digital numbers representing the reflectivity of each pixel of the document 10. The scanner 12 can be a high speed, full frame TV camera, such as is commercially available.

Alternate embodiments for the scanning process are possible. For example, the document may take the form of a transparency, such as microfiche, and the specimen illuminator might, instead of causing most of the light to be reflected from the document it would pass through the image of a document on the film. The scanner would be located strategically to capture the transmitted light, and the signals received from the scanner would be a measure of the transmissivity of the document image on film rather than the reflectivity.

A flow analysis of the digital imaging process of the present invention will be discussed. Each of the components involves multiple elements of the digital imaging system which work in combination to produce the labeled function.

The analog pixel signals generated by the CCD array in the scanner 12 are converted to an eight-bit digital number in the scanner. Preprocessing of the digital data may occur to either classify the type of document to determine if pictures or graphics are present or determine how the document was printed. In any event, this is the job of a preprocessor 14. The raw data could also be stored directly from the scanner 12 and retrieved for preprocessing at a later time. In an effort to maintain high throughput with the highest efficiency, the data is preprocessed on line and then stored in ASCII format after optical character recognition has been completed. This requires much less memory than storing the bitmapped image of the document even in a compressed form.

It should be understood that certain printing techniques result in nonuniform pixel density variations across character strokes such as: dot-matrix, bubble jet, pinwheel and inkjet. Accordingly, dot-matrix is intended to include types of printing that have nonuniform pixel density variations across character strokes.

Discriminating between dot-matrix/inkjet and non-dot-matrix/inkjet printed matter will facilitate the use of optimized OCR algorithms to provide faster and more accurate recognition.

Before the present system can begin to recognize whether a character was printed using ink jet or dot matrix printing, the character image must have been separated from the images of other characters on the document. The separation of adjacent character images from one another is typically performed by a segmentation process which simply declares the two regions to be different character images separated by the column or row found to be devoid of "on" pixels. Such a segmentation technique is often referred to as "histogramming".

To perform this gross segmentation process using histogramming requires that the background level ($T_b$) be determined. Each pixel in each scan line must be tracked or evaluated based on its density. Each occurrence of each density is recorded or counted so that the number of occurrences of that density within the document is found and that count placed in an appropriate bin, with one bin for each of 255 levels of density levels. This procedure is followed for all of the scan lines in the image and for every pixel in every scan line. Typically, in a graph (FIG. 4) of counts vs. density levels the first peak that is found on the density axis represents the background density $T_b$ of the paper or document being scanned.

The value of the background (e.g. what the black writing is surrounded by) is useful when performing a gross segmentation process which will identify lines of characters by histogramming in the vertical direction (FIG. 2). Accordingly, histogramming or gross segmentation in the horizontal direction will identify lines of text.

After locating the character regions further histogramming in those regions can be used to identify what is commonly known as a "bounding box" around each character.

In order to define the bounding box as shown in FIG. 3, a histogram of pixels greater than the background ($T_b$) is taken in the vertical and horizontal directions, as shown. Where the histograms decrease to zero (where 0 is greater than $T_b$), the corresponding pixel position is where the boundaries of the bounding box are defined. Upper and lower bounding rows 18 and 20 respectively, are established using horizontal histograms and the leftmost and rightmost columns 22 and 24 respectively, are defined using vertical histogramming.

Once the bounding box 26 has been established, a density histogram for the pixels inside the bounding box 26 is generated. From this histogram, the background density is established and a suitable threshold level is determined (FIGS. 3, 5 and 8).

Next, three horizontal 28, 30, and 32 and vertical 34, 36, and 38 slices are typically made through the character as shown in FIG. 5. The slice locations 28–38 can be either at fixed positions or can be determined empirically, based upon regions of the character exhibiting maximum pixel density. FIGS. 5 and 8 both show slices taken at empirical locations.

Along each slice, pixel density difference data for pixels with densities greater than a threshold ($D_t$) are generated. FIG. 5a illustrates a plot of density vs. pixel positions for slice 1 of a typewritten "A". Similarly, FIG. 5b is the plot of density difference vs. pixel position for the same slice and character. The density difference data is computed simply by taking the difference between adjacent pixel densities: $d_{i+1} - d_i$. As can be seen in FIG. 5a, as one traverses the character bitmap from the left of slice 1 to the right, the density increases, slightly decreases, increases and then gradually decreases. If one were to look at density values greater than $D_t$, and then compute the difference data and plot it graphically as illustrated in FIG. 5b, it can be seen that only a single sign change takes place.

Figure 8:
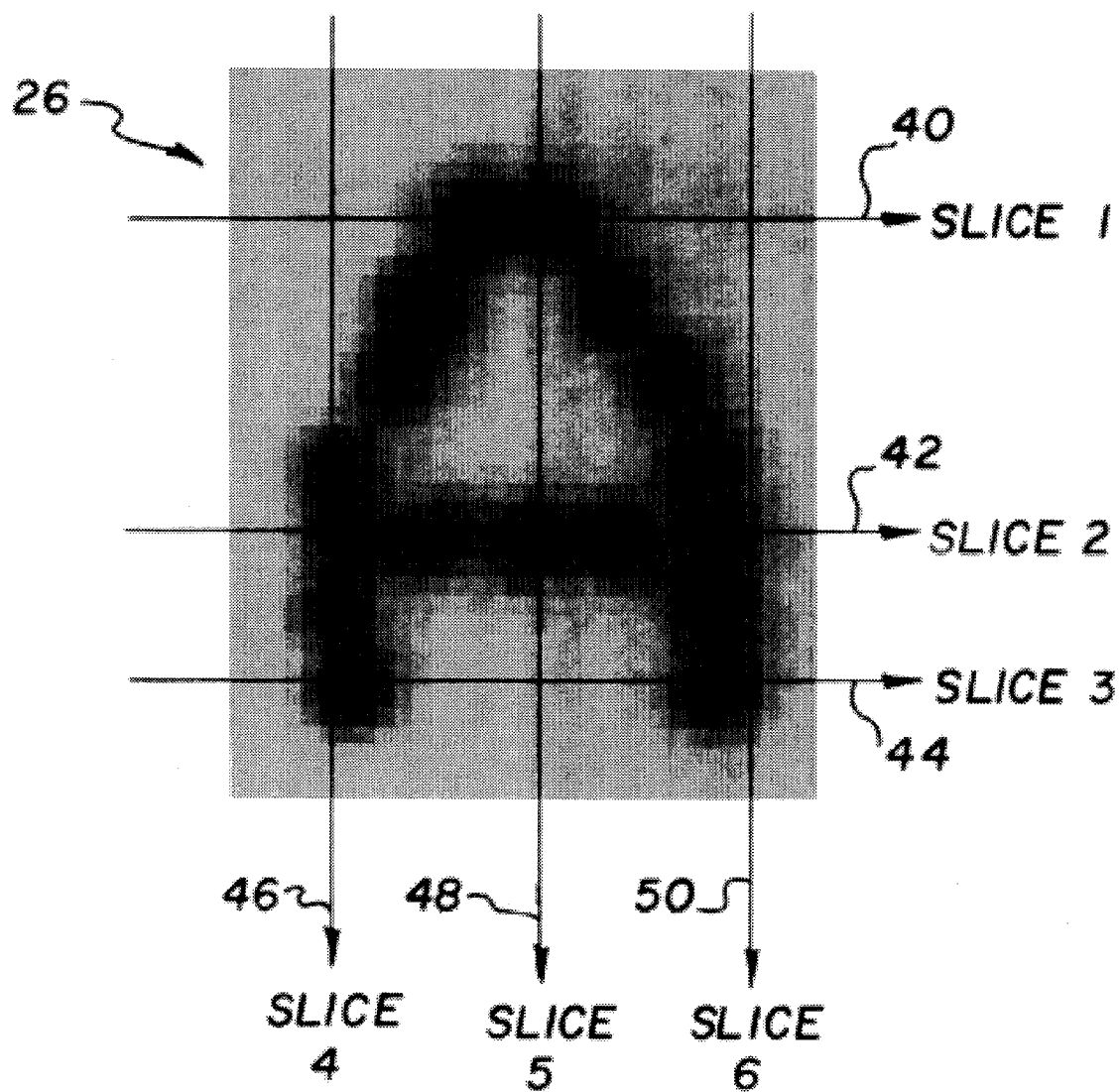
FIG. 8 illustrates a dot-matrix printed letter "A" showing the three horizontal and three vertical slices through the character along which density values are stored and profiles are generated.
Figure 9A:
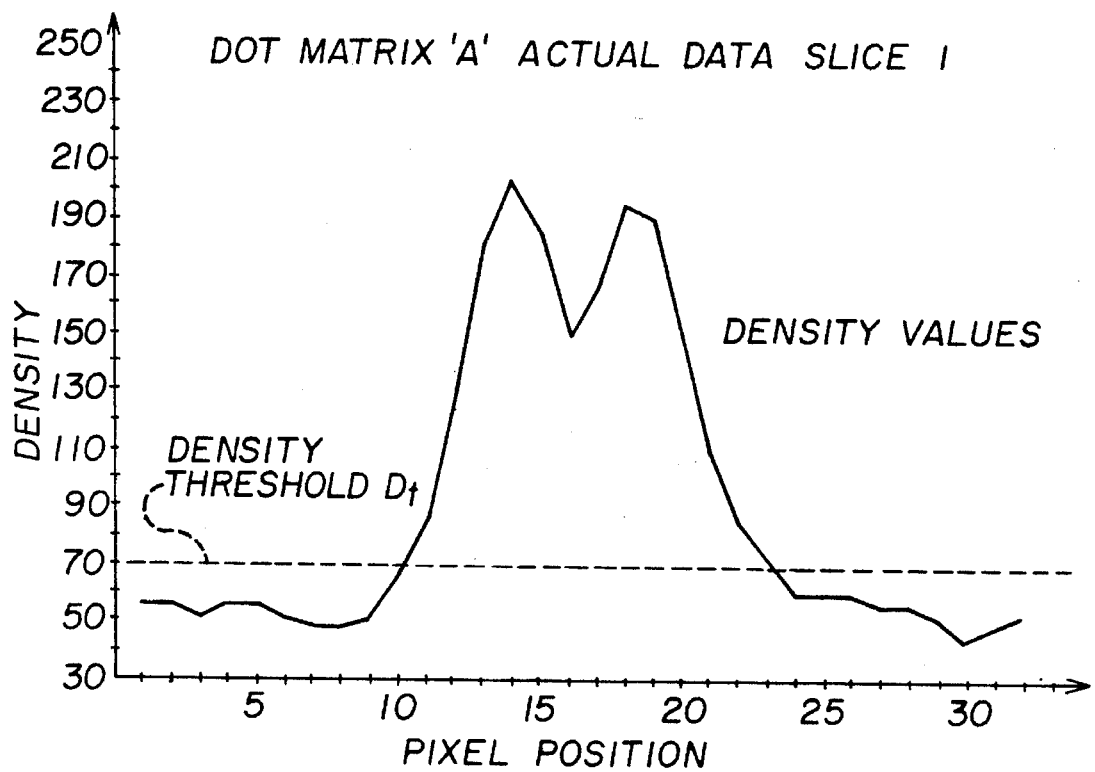
FIG. 9A illustrates a plot of the density measurements vs. pixel positions along horizontal slice 1 of the character in FIG. 8.
Figure 9B:
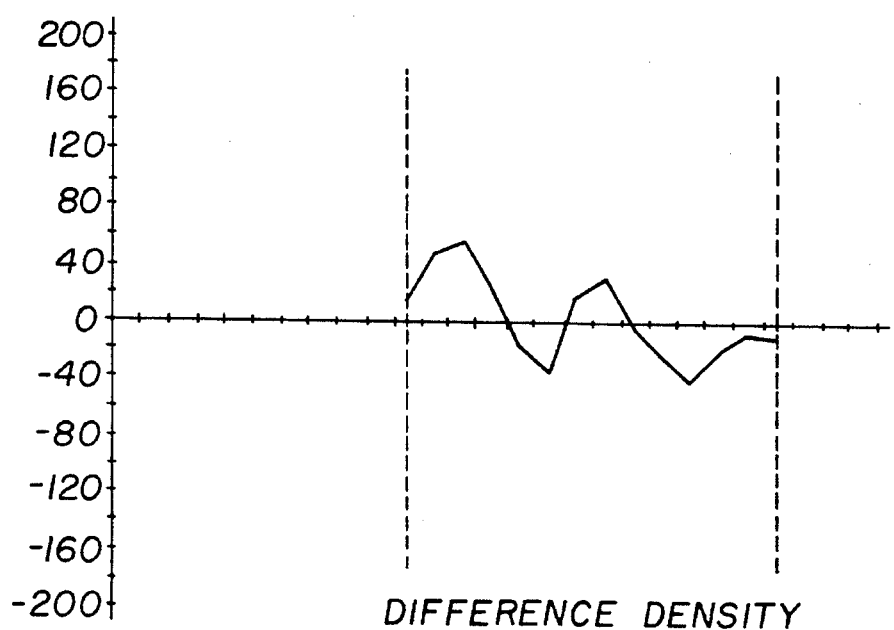
FIG. 9B illustrates a plot of pixel density difference data vs. pixel position for the same slice in the character shown in FIG. 9A. The density difference data is computed by taking the difference between adjacent pixel densities in FIG. 9A.

On the other hand, this same analysis is applied to a dot matrix generated "A" as shown in FIG. 8 with horizontal slices 40, 42 and 44 corresponding to slices 1, 2, and 3. Vertical slices 46, 48 and 50 correspond to slices 4, 5, and 6. FIGS. 9A and 9B, and it can be noted that in the graphical plot of the difference data three (3) sign changes take place.

Figure 7A:
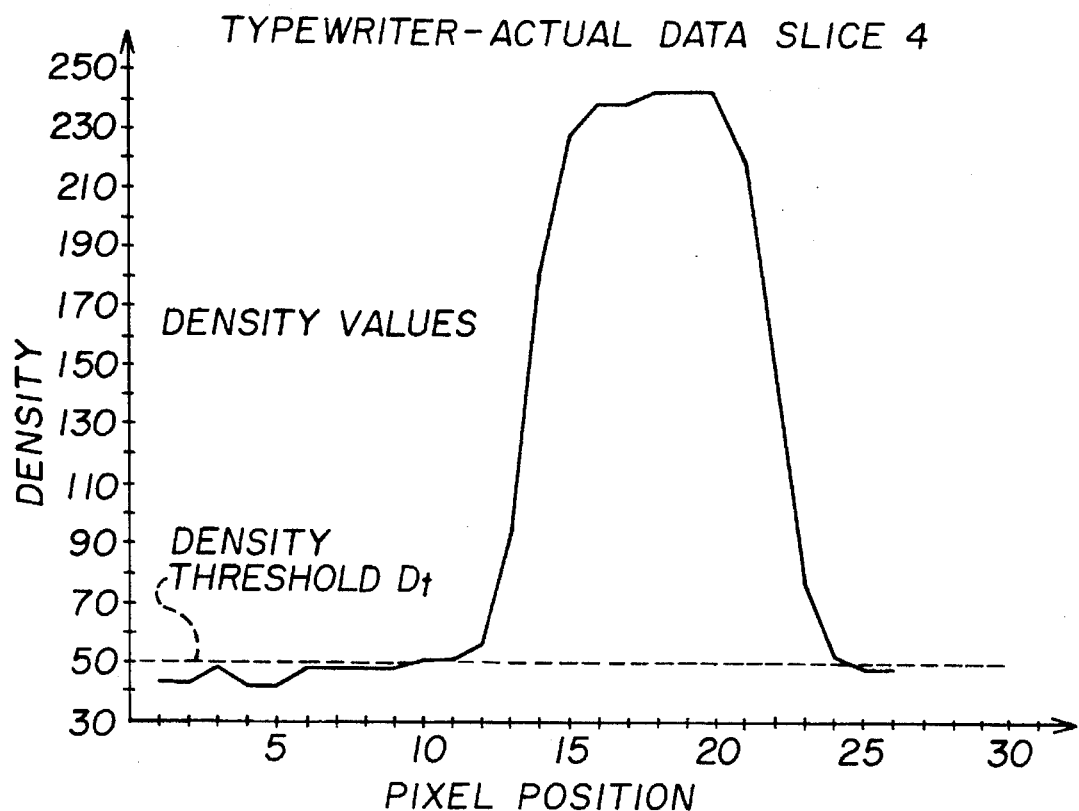
FIG. 7A illustrates a plot of the density vs. pixel position along vertical slice 4 of the characters in FIG. 5.
Figure 7B:
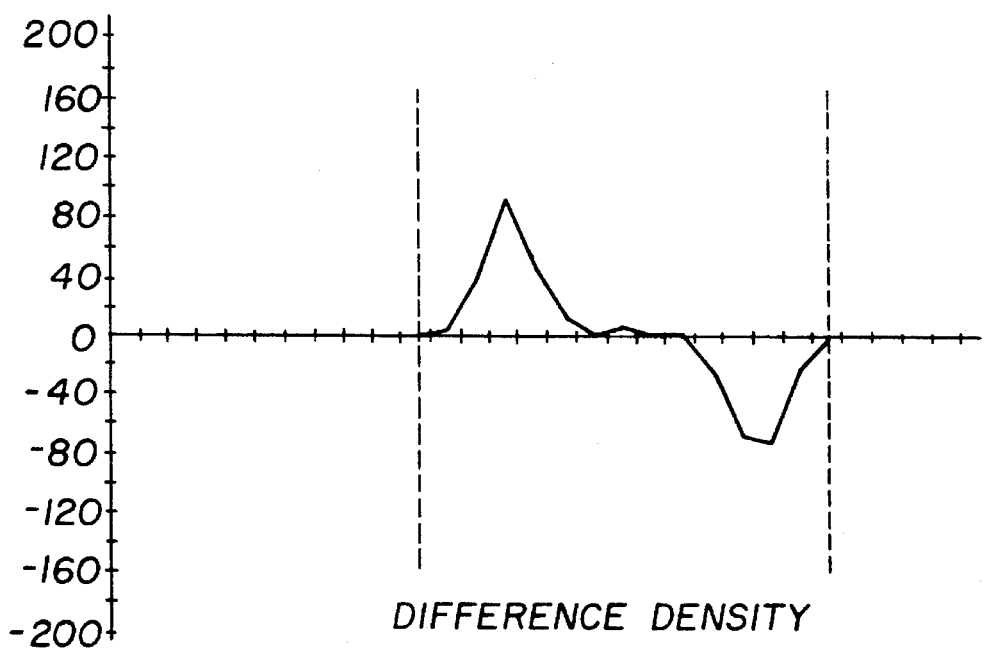
FIG. 7B illustrates a plot of pixel density difference data vs. pixel position for the same slice in the character shown in FIG. 7A. The density difference data is computed by taking the difference between adjacent pixel densities in FIG. 7A.
Figure 10A:
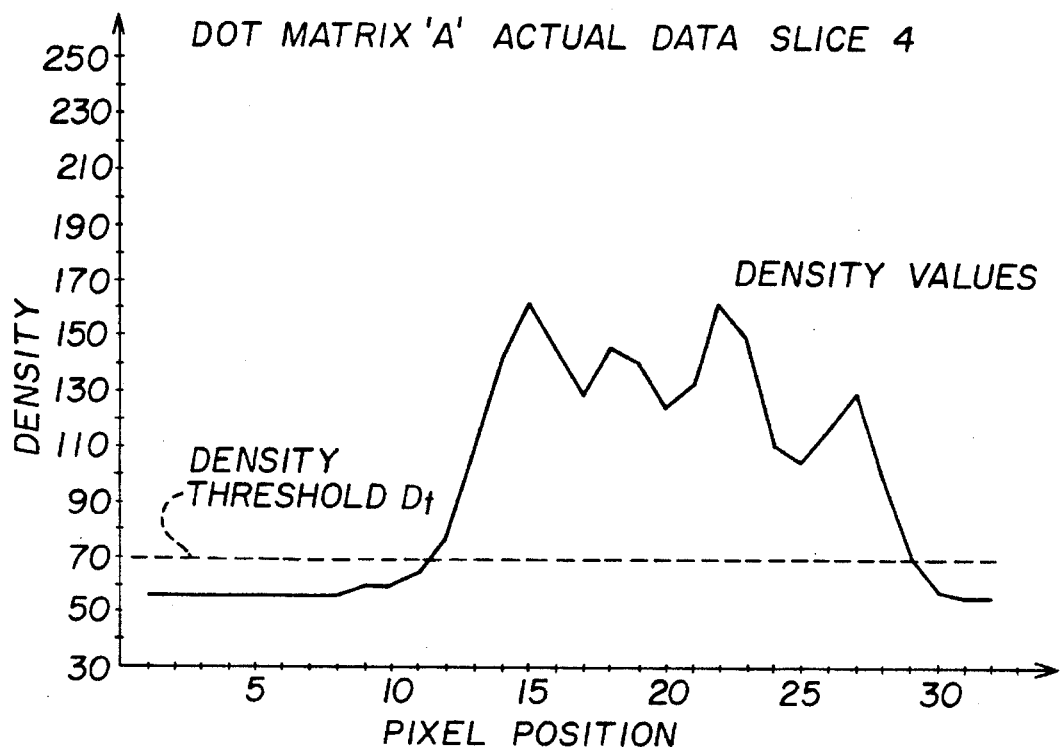
FIG. 10A illustrates a plot of the density vs. pixel position along vertical slice 4 of the character in FIG. 8.
Figure 10B:
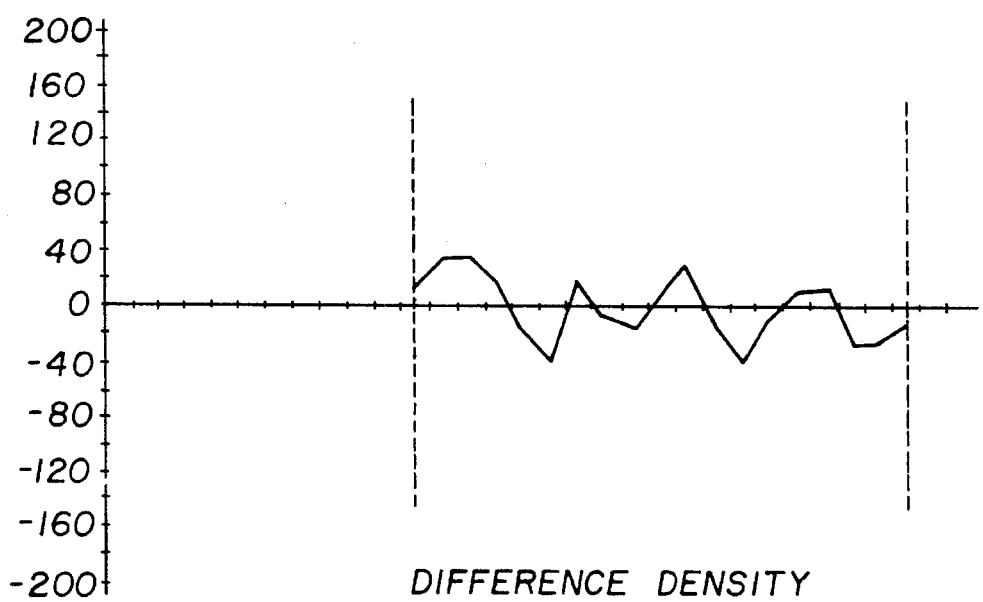
FIG. 10B illustrates a plot of pixel density difference data vs. pixel position for the same slice in the character shown in FIG. 10A. The density difference is computed by taking the difference between adjacent pixel density in FIG. 10A.
Figure 11:
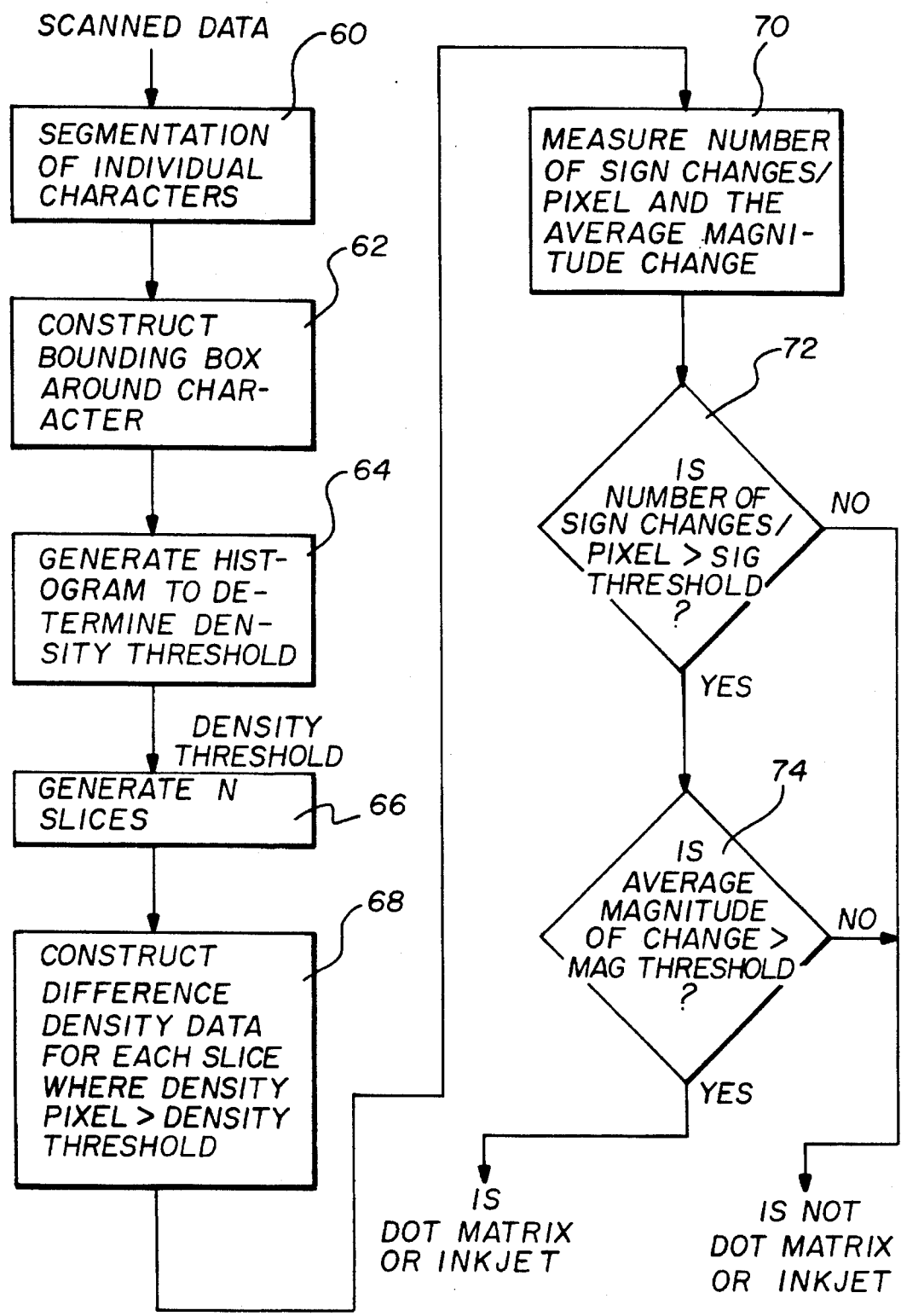
FIG. 11 is a flow diagram of the present invention.

Using similar analysis using a vertical slice 4 similar results will be found. FIGS. 7A and 7B are based on a typewritten "A" with FIGS. 10A and 10B relating to a dot matrix generated "A". Once again, the difference data is used to compute the number of sign changes per pixel. This is determined by counting the number of sign transitions (+/− or −/+), and dividing by the quantity of pixels over which the number of transitions was determined. It should also be noted that another feature evident from the density difference curves is that the magnitude of the transitions from positive to negative are considerably larger for characters printed on a dot matrix than for conventionally printed characters.

Therefore, both the quantity of sign changes per pixel and the average magnitudes associated with the slices of the character. If these two values exceed predetermined thresholds (to be determined empirically), the printed matter is classified as dot matrix or ink jet.

It should be noted that in practice, it would be possible to use the whole word and construct a bounding box around the word and then generate the difference density from several slices draw through the word.

Flow Chart

The scanned data is first subjected to the process of segmentation in step 60 to identify individual characters. Accordingly, the pixel data associated with a character from a matrix of pixel data in a multifont optical image system so as to enable the pixel data associated with a character to be singled out for use in subsequent operations.

In step 62, constructing or selecting an examination window whose size covers the image data associated with a character within a set of characters. Image data associated with a known character is presented to the examining window to obtain a probability density function for each pixel within the examining window for each character in the set of characters to be formed or segmented to generate a composite probability density function for each pixel within the examining window. The composite probability density function is then used to determine when the enabling window is positioned over image data associated with a character within the character set.

Step 64 results in the generation of a histogram within the selected bounding box or window to determine a density threshold.

Step 66 results in the generation of six slices through the window or bounding box with three of the slices being horizontal and three being vertical. The location of the slices can be at fixed positions or can be determined empirically, based upon regions of the character exhibiting maximum pixel density. In addition, the number of slices can also be determined empirically.

Step 68 requires that along each slice pixel density difference data for pixels with densities greater than a threshold ($D_t$) are generated and plotted on a graph of density vs. pixel positions for each slice.

In step 70, using the plot of difference data vs. pixel position, the density difference data is computed by taking the difference between adjacent pixel density i $d_{i+1}-d_i$. Plotting density difference values vs. pixel position results in the ability to observe sign changes in the plot. In addition, the average magnitude of the changes are also measured. Threshold levels are also set for each of these measurements. That is a threshold level for the number of times the sign changes per pixel and the threshold for the average magnitude of change. In the event both these thresholds in steps 72 and 74 are exceeded then it is an indication that the printing apparatus used was either dot matrix or inkjer. If only one threshold or none are exceeded, then the printed apparatus was of a higher quality such as a daisywheel.

Advantages and Industrial Applicability

The present invention is used to identify text as having been printed on a dot matrix or ink jet printer. This will allow optical character recognition sites a way of sorting their documents into two classes of documents, OCR readable and non-OCR readable text documents. Wherein the dot-matrix/inkjet non-OCR readable documents can become OCR readable using specialized OCR algorithms developed to handle dot-matrix/inkjet printed documents.

Although the invention has been presented as being applied to paper documents that are scanned, it could also find application in reading microfilm having images of documents printed by a dot-matrix or ink jet printer.

What is claimed is:

1. A method of preprocessing document images to identify the text as being printed by either a dot matrix or ink jet type printing device, comprising the steps of:
   a) optically scanning said document images so as to produce image data signals representing picture elements of said document images;
   b) digitizing said image data signals; and by means of a processor:
   c) segmenting pixel data associated with a character from a matrix of pixel data so as to enable the pixel data associated with an individual character to be isolated from the rest;
   d) forming a bounding box around the characters so isolated;
   e) generate a grey level histogram of the character within the bounding box to establish a density threshold;
   f) generate a plurality of slices through the bounding box;
   g) store the density per pixel position along each slice;
   h) generate difference density data for each slice using adjacent pixels and the density per pixel position measured for each slice;
   i) count the number of sign changes per pixel and the average magnitude change of difference data for each slice;
   j) establish a threshold for the number of sign changes per pixel and the average magnitude of change; and
   k) identify text printing device as either being a dot matrix or inkjet device when the sign changes per pixel and average magnitude both exceed their respective threshold.

2. The method of preprocessing as set forth in claim 1 wherein said segmenting step further includes vertical and horizontal histogramming to isolate individual characters.

3. The method of preprocessing as set forth in claim 1 wherein said plurality of slices further comprise three horizontal and three vertical slices.

4. The method of preprocessing as set forth in claim 1 wherein said plurality of slices further comprise three equally spaced horizontal slices and three equally spaced vertical slices.

5. The method of preprocessing as set forth in claim 2 wherein the location of each vertical slice and horizontal slice are emperically determined.

6. The method of preprocessing as set forth in claim 5 wherein the identification of the printing device as dot matrix will result in the selection of appropriate optical character recognition software for that type of printed text material.

7. The method of preprocessing as set forth in claim 5 wherein the identification of the printing device as inkjet will result in the selection of appropriate optical character recognition software for that type of printed text material.

8. The method of preprocessing as set forth in claim 5 wherein the identification of the printing device as something other than inkjet or dot matrix will result in the selection of appropriate optical character recognition for that type of printed text material.

9. The method of preprocessing as set forth in claim 2 wherein the number of vertical slices and the number of horizontal slices are emperically determined.

* * * * *